United States Patent
Lin et al.

(10) Patent No.: US 7,760,979 B2
(45) Date of Patent: Jul. 20, 2010

(54) SYSTEM AND METHOD FOR LOW LOSS WAVEGUIDE BENDS

(75) Inventors: Chao-Kun Lin, Fremont, CA (US);
Kostadin Djordjev, San Jose, CA (US);
Michael Renne Ty Tan, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 311 days.

(21) Appl. No.: 11/060,338

(22) Filed: Feb. 17, 2005

(65) Prior Publication Data

US 2006/0182399 A1    Aug. 17, 2006

(51) Int. Cl.
G02B 6/10    (2006.01)
(52) U.S. Cl. ............................. 385/129; 385/18; 385/31
(58) Field of Classification Search ................ 385/129, 385/37, 18, 31, 39, 42, 50, 52, 47
See application file for complete search history.

(56) References Cited

U.S. PATENT DOCUMENTS

| | | | | |
|---|---|---|---|---|
| 4,173,390 A * | 11/1979 | Kach | ............................ | 385/44 |
| 4,740,951 A * | 4/1988 | Lizet et al. | .................... | 398/87 |
| 4,786,133 A * | 11/1988 | Gidon et al. | .................. | 385/37 |
| 4,796,226 A * | 1/1989 | Valette | ........................ | 365/122 |
| 4,842,357 A * | 6/1989 | Doneen | ........................ | 385/12 |
| 5,182,787 A * | 1/1993 | Blonder et al. | .............. | 385/131 |
| 5,228,103 A * | 7/1993 | Chen et al. | ..................... | 385/14 |
| 5,253,319 A * | 10/1993 | Bhagavatula | ................ | 385/129 |
| 5,355,237 A * | 10/1994 | Lang et al. | ..................... | 385/14 |
| 5,371,813 A * | 12/1994 | Artigue | ........................ | 385/24 |
| 5,432,876 A * | 7/1995 | Appeldorn et al. | ............ | 385/31 |
| 5,581,643 A * | 12/1996 | Wu | ............................. | 385/17 |
| 5,675,675 A * | 10/1997 | Trouchet | ..................... | 385/24 |
| 5,799,118 A * | 8/1998 | Ogusu et al. | .................. | 385/14 |
| 5,835,458 A * | 11/1998 | Bischel et al. | ........... | 369/44.12 |
| 5,841,931 A * | 11/1998 | Foresi et al. | ................ | 385/131 |
| 5,937,113 A * | 8/1999 | He et al. | ....................... | 385/11 |

(Continued)

FOREIGN PATENT DOCUMENTS

CN    1438504 A    8/2003

(Continued)

OTHER PUBLICATIONS

Intellectual Property Office of China, 4 Month Office Action dated Jul. 11, 2008.

(Continued)

*Primary Examiner*—Ellen Kim

(57) ABSTRACT

In one embodiment, there is disclosed a waveguide medium using total internal reflection to create a relatively sharp (approximately 90°) bend for optical signals traversing the waveguide. A discontinuity of the medium (such as air) is used to create a turning mirror within the waveguide path. By curving the discontinuity, the entire input optical signal is focused into the output portion of the waveguide, thereby compensating for the diffraction loss of the optical signal at the bend. In one embodiment in order to facilitate proper alignment of the masks certain portions of the waveguide on a first mask are extended (widened) beyond their optimum physical size. This extended portion is then used to position an edge of a second mask, such that optical signal scatter caused by the extended portions of the waveguide are compensated for by adjusting the curvature.

10 Claims, 5 Drawing Sheets

U.S. PATENT DOCUMENTS

| | | | |
|---|---|---|---|
| 6,081,499 A * | 6/2000 | Berger et al. | 369/112.27 |
| 6,111,674 A * | 8/2000 | Bhagavatula | 398/1 |
| 6,134,369 A * | 10/2000 | Kurosawa | 385/132 |
| 6,169,838 B1 * | 1/2001 | He et al. | 385/129 |
| 6,259,841 B1 * | 7/2001 | Bhagavatula | 385/47 |
| 6,325,553 B1 * | 12/2001 | Deacon et al. | 385/89 |
| 6,339,662 B1 * | 1/2002 | Koteles et al. | 385/24 |
| 6,360,047 B1 * | 3/2002 | Nekado et al. | 385/129 |
| 6,546,163 B2 * | 4/2003 | Thackara | 385/18 |
| 6,563,997 B1 * | 5/2003 | Wu et al. | 385/130 |
| 6,614,574 B2 * | 9/2003 | Romanovsky | 359/247 |
| 6,792,182 B1 * | 9/2004 | Davies et al. | 385/37 |
| 6,804,446 B1 * | 10/2004 | Nordin et al. | 385/132 |
| 6,870,978 B2 * | 3/2005 | Purchase et al. | 385/14 |
| 6,993,213 B2 * | 1/2006 | Takagi | 385/14 |
| 7,164,824 B2 * | 1/2007 | Rasras et al. | 385/50 |
| 2004/0208465 A1 * | 10/2004 | Logvin et al. | 385/129 |
| 2005/0089262 A1 * | 4/2005 | Jenkins et al. | 385/14 |

FOREIGN PATENT DOCUMENTS

| | | |
|---|---|---|
| JP | 1-223403 | 9/1989 |
| JP | 2003-207661 | 7/2003 |

OTHER PUBLICATIONS

Intellectual Property Office of China, 2 Month Office Action dated Dec. 12, 2008.

* cited by examiner

SYSTEM AND METHOD FOR LOW LOSS WAVEGUIDE BENDS

STATEMENT REGARDING FEDERALLY SPONSORED RESEARCH OR DEVELOPMENT

The invention was made in part with Government support by Defense Advanced Research Projects Agency (DARPA) under Grant Number MDA972-03-03-0004. The Government has certain rights in the invention.

BACKGROUND OF THE INVENTION

It has become common place to route optical signals within optoelectronic devices using waveguides created within a medium housing other circuit components. These devices are known as Photonic Integrated Circuits (PICs) and the passive waveguides are used to route optical signals between active devices on such circuits. Waveguides are also used in such circuits to route optical signals to/from other circuits, usually via fiber ports.

As the density of such PICs increases, so does the need for sharp turns along the path of the waveguides. These sharp turns are often on the order of 90 degrees. To avoid radiation loss of the optical signal at the bends, waveguides with high index contrast medium are used. The high index waveguide tightly confines the optical modes in the lateral direction by the large index discontinuity between the waveguide core and the surrounding medium (e.g., dielectric/air). However, because of the tight optical confinement such high index contrast waveguides experience more scattering loss from roughness in the waveguide side-walls (introduced during manufacturing) than do low index contrast waveguides.

Waveguides with low index contrast (e.g. ridge-loaded waveguide, buried waveguide, etc.) are preferable for single mode operation due to their larger cross-sectional dimensions (>1 µm) allowing for relatively easy fabrication using conventional optical lithography and the fact that they are better mode-matched to optical fiber which results in low power coupling loss. However, low index waveguides require a relatively large (greater than a few mm) bending radius to avoid excessive attenuation due to radiation loss. Thus, low index waveguides are not suitable for use in devices requiring sharp bends along the optical signal path.

FIGS. 1A and 1B show prior art waveguide 10 having discontinuity interface 11. As shown on FIG. 1A, light enters the waveguide at input port 12 and progresses within the waveguide as an optical mode until it reaches discontinuity 11 which, in the embodiment, is an air interface. Edge 19 of discontinuity 11 is approximately 45° to the direction of travel of the light. As will be seen from FIGS. 4A and 4B, because of the 45° angle and the difference in index of refraction between the medium (waveguide core) of waveguide 10 and the medium of discontinuity 11 (air), the optical mode experiences TIR and is channeled within the waveguide to output 13. In this manner, a sharp bend (in the order of 90°) is effectuated by the air interface of TIR turning mirror 11. The turning angle can be greater than 90°, as long as the incident angle of the input beam on the TIR mirror is greater than the critical angle.

The waveguide shown in FIG. 1A illustrates a ridge waveguide with ridge 14 above upper cladding 15 which in turn is above waveguide core 16. Below waveguide core 16 is lower cladding 17, all of which is constructed above substrate 18. Note that the entire structure 10 is typically constructed as a unitary structure by etching away certain portions, all as is well-known. The air around the ridge forms an index step to confine the wave laterally. Ridge 14 and the upper cladding can be the same material or different material. Waveguide core 16 is a continuous slab, except for air trench 11 which forms the TIR mirror which is etched through the waveguide core and into lower claddings layer 17. Guided optical waves that are to pass through waveguide 10 enter input port 12 and exit output port 13. Outline 101 shows a typical guide mode profile.

FIG. 1B is a view of waveguide 10 where ridge 14 has been lifted for clarity. Trench 11 is created by anisotropically etching down to the lower cladding of the waveguide to avoid radiation loss to the lower cladding and substrate at the TIR mirror. Ideally all of the energy of the guided wave should be reflected by the dielectric air interface and should enter output wave portion 13. However, as shown by guide mode profile 101 (FIG. 1A), a significant amount of energy of the guided wave extends ridge width "w" due to weak lateral index guiding.

The energy tails of the lateral mode profile experience additional phase delays when the guided wave traverses the waveguide core region being reflected from front surface 19 (FIGS. 1A and 1B) of TIR discontinuity 11. The extra phase delay distorts the guided wave front and results in diffraction loss.

FIG. 4 illustrates one prior art method of constructing discontinuity interface between guide portions 12 and 13. TIR mirror 43 is constructed with two separate mask levels. The first mask level is used to define waveguide portions 12 and 13, and the TIR mirror is defined by both mask levels 1 and 2. The process flow is shown in FIGS. 6A-6D and 7A-7D and illustrates why misalignment changes the TIR mirror interface. Even with submicron alignment accuracy tools, there is no guarantee that the shape and position of the turning mirror can be reproduced within a given accuracy range. Slight misalignment will have large effects on the efficiency of the turning mirror to perform its intended function.

FIG. 1C shows a cross-section view of prior art waveguide 10 (as shown in FIG. 1A) taken along line 1C-1C and shows one prior art method of constructing the discontinuity interface.

FIG. 1D shows a cross-section view of prior art waveguide 10 (as shown in FIG. 1A) taken along line 1D-1D

BRIEF SUMMARY OF THE INVENTION

A low index contrast waveguide medium using total internal reflection (TIR) is used to create a relatively sharp (approximately 90°) bend for optical signals traversing the waveguide. A discontinuity of the medium (such as air) creates a turning mirror within the waveguide path. By curving the discontinuity, the entire input optical beam is focused into the output portion of the waveguide, thereby compensating for the diffraction loss at the turning mirror.

Reproducibly fabricating the waveguide bends with turning mirrors is accomplished by defining the TIR mirror on the same mask pattern with the waveguide pattern. To facilitate proper alignment of the masks certain portions of the waveguide on a first mask are extended and widened beyond their optimum physical size. This extended portion is then used to position an edge of a second mask for forming discontinuity in the medium, such that any misalignment introduced by manufacturing processes will not alter the relative position between the turning mirror and waveguide. The optical signal scattering loss caused by the extended portions of the waveguide are compensated for by adjusting the curvature.

DETAILED DESCRIPTION OF THE INVENTION

Figure 1A:
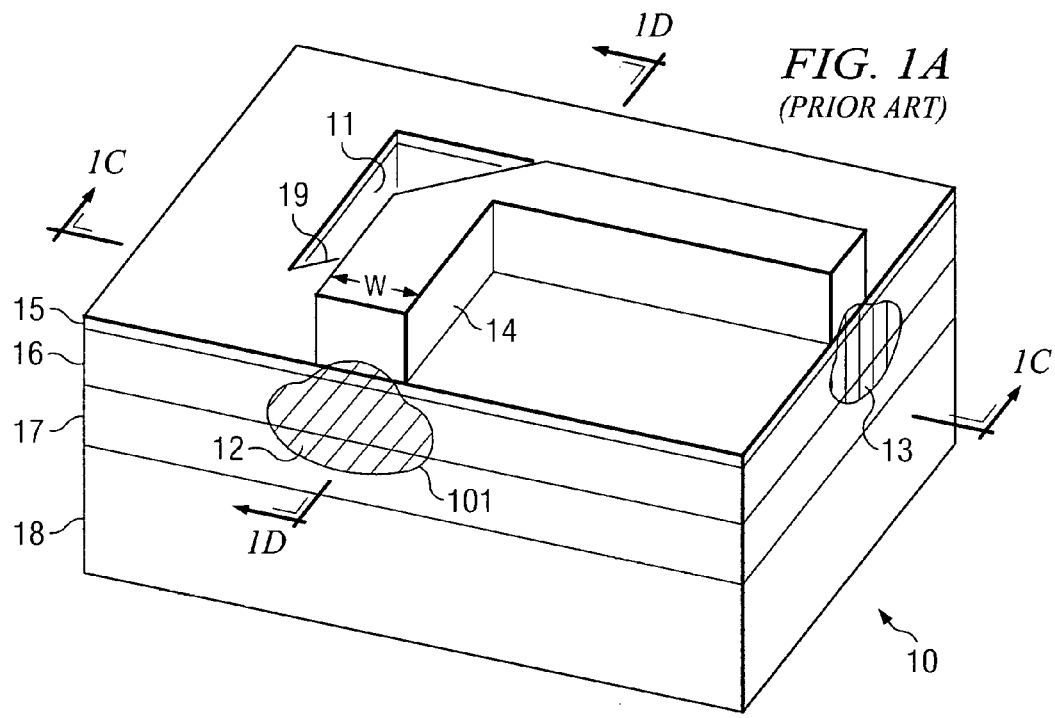
FIGS. 1A and 1B show a prior art waveguide having a discontinuity interface.
Figure 1B:
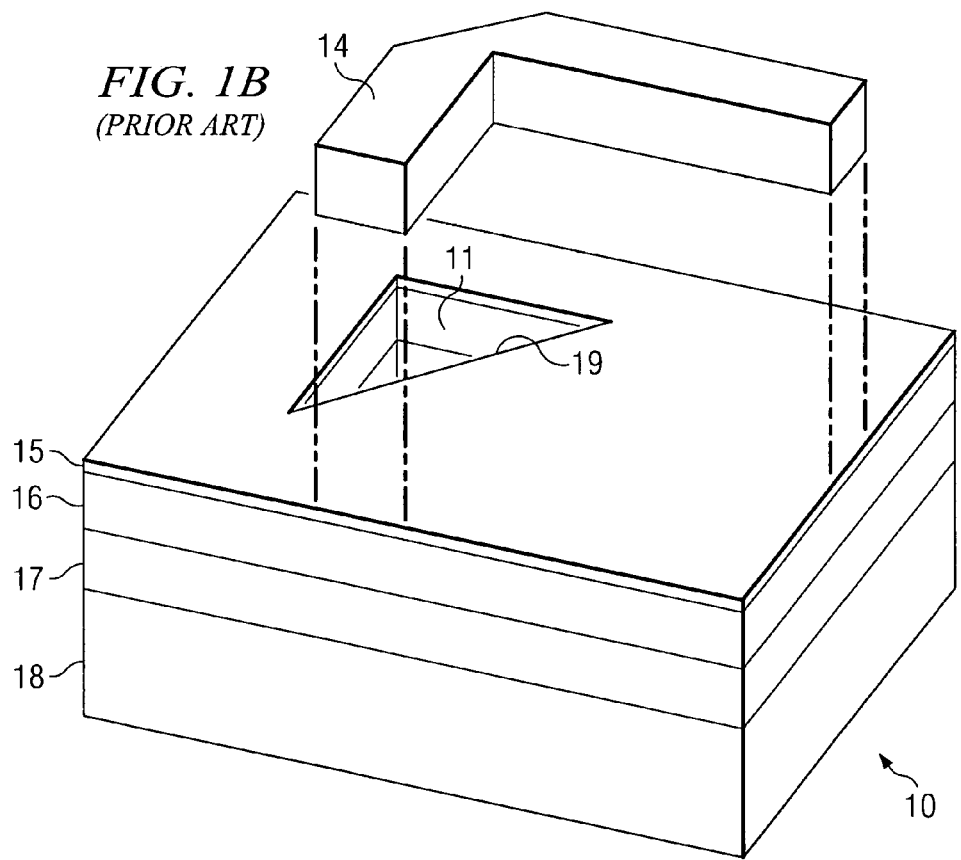
Figure 1C:
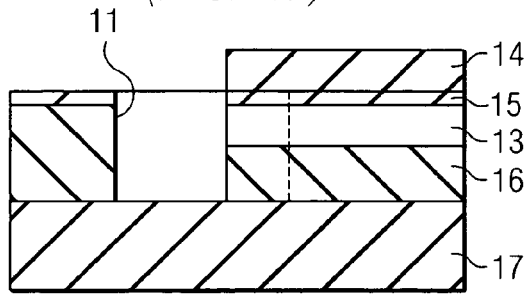
FIGS. 1C and 1D show cross-sections of the prior art waveguide.
Figure 1D:
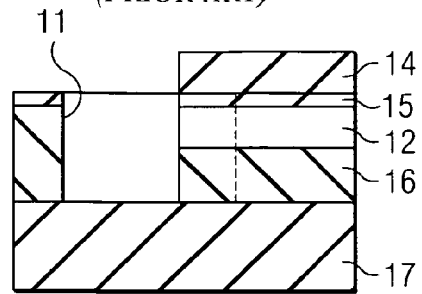
Figure 2:
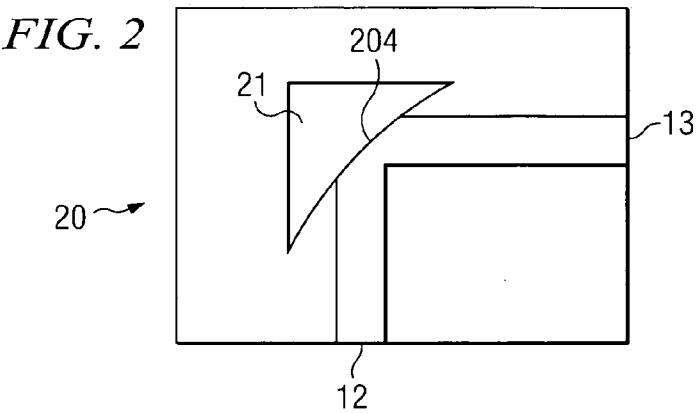
FIG. 2 shows one embodiment of the invention illustrating the curved discontinuity forming a turning mirror for a low index contrast waveguide.

FIG. 2 shows one embodiment 20 in accordance with the invention illustrating curved front surface 204 of TIR discontinuity 21. Waveguide 20 can be a ridge waveguide as shown in FIG. 1A with a curved interface with discontinuity 21. The discontinuity is created by an air medium different from the medium of waveguide portion 12 as discussed with respect to FIG. 1A. The curved interface compensates for the phase difference of the reflected guided wave at different regions of the lateral mode profile thereby focusing at least a substantial portion (if not all) of the diffracted optical wave into output waveguide portion 13. The optimal radius of curvature depends on the configuration of the waveguide, such as the waveguide medium and the waveguide width. The optimal radius of curvature can be calculated with commercially available Finite Difference Time Domain (FDTD) code given waveguide parameters.

It is important to achieve very good alignment of optical surface 204 with waveguide portions 12 and 13 in order to focus the optical signals back into output waveguide portion 13 in an efficient manner. However, typically the waveguide and turning mirror discontinuity are fabricated as two separate process steps thereby leading to potential misalignments of interface 204 with guide portions 12 and 13.

Figure 3A:
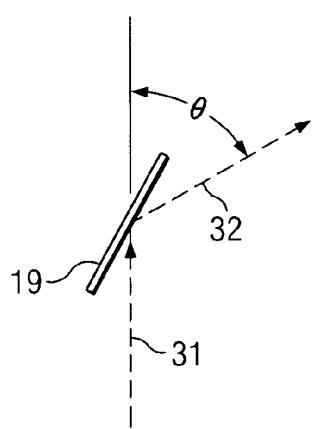
FIGS. 3A and 3B show turning angle calculations.
Figure 3B:
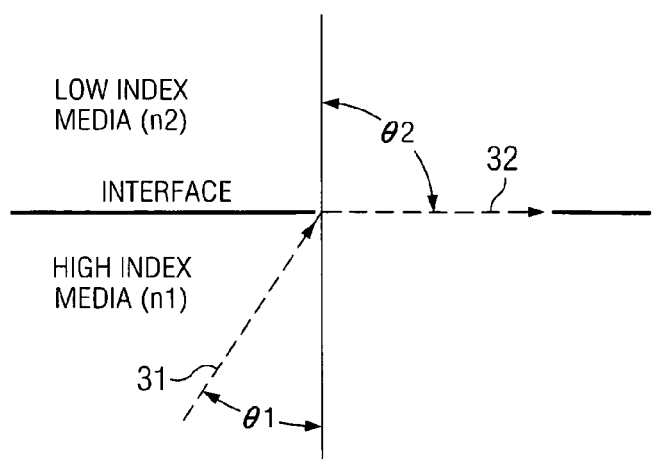
Figure 4:
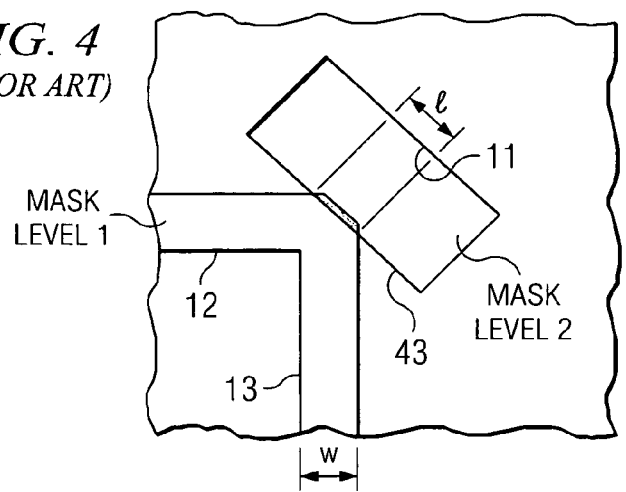
FIG. 4 shows a prior art method of constructing the discontinuity interface.

FIG. 3A shows that the turning angle θ between input beam 31 and output beam 32 can be greater than 90° as long as the incident angle of the input beam (such as beam 31) at TIR mirror surface 19 (FIG. 1A) is greater than the critical angle, as shown in FIG. 3B.

Figure 5A:
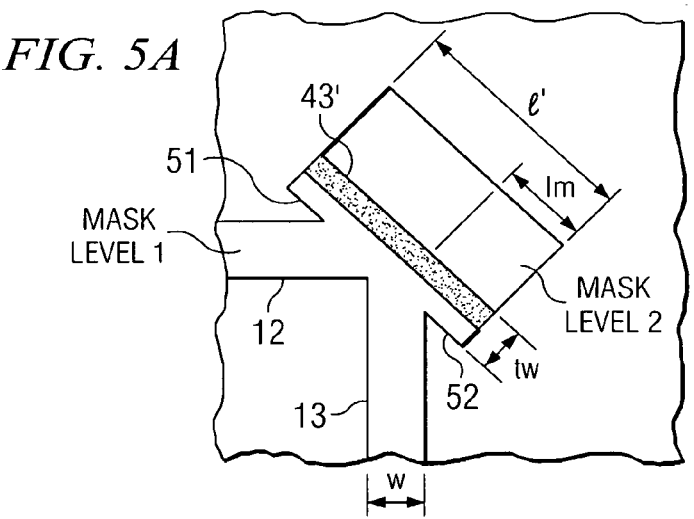
FIGS. 5A and 5B show embodiments of the invention for self aligning the discontinuity mask for constructing the discontinuity interface.
Figure 5B:
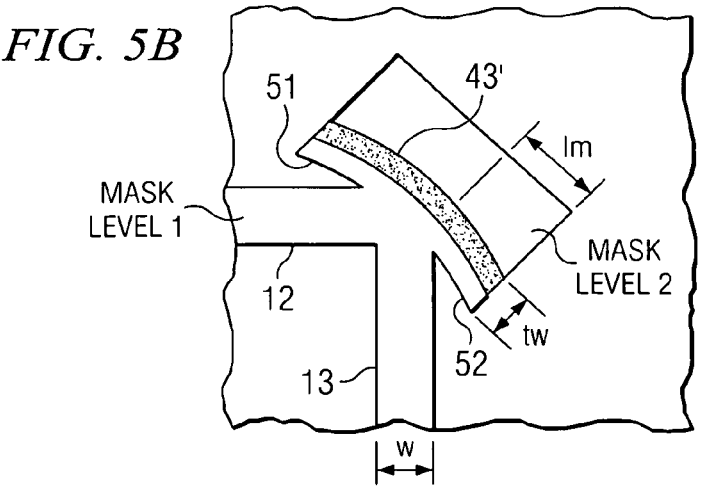

FIGS. 5A and 5B show one embodiment in accordance with the invention for self-aligning the discontinuity mask for constructing the discontinuity interface. As shown in FIG. 5A, wing patterns 51 and 52 are extended outward from the actual waveguide corner on the same mask level with waveguide portions 12 and 13. The relative position of TIR discontinuity 43 with respect to waveguide is pre-determined on the same mask level. The opening of mask level 2 reveals the edge of mask level 1 for TIR mirror 43. The misalignment between mask level 1 for the waveguide and mask level 2 for the trench opening will not affect the shape and position of the TIR mirror, as long as the width tw of wings 52, 53 is greater than 2× the alignment tolerance of the optical lithography tool. Therefore, the TIR mirror structure can be reproduced regardless of manufacturing errors. The length, 1 m, of the wings 52, 53 should be long enough to reflect all the mode profile of the input optical signal into the output waveguide portion. In one embodiment in accordance with the invention, the extended portion is five times the width of the optical mode profile. The extra structure created by wing patterns 51 and 52 will introduce a small index step for the waveguide in the propagation direction. This index step tends to scatter the guided wave but can be compensated for, if desired by adjusting the radius of curvature for the turning mirror interface as discussed above, with respect to FIG. 2. Such a curved expanded structure is illustrated in FIG. 5B.

Figure 6A:
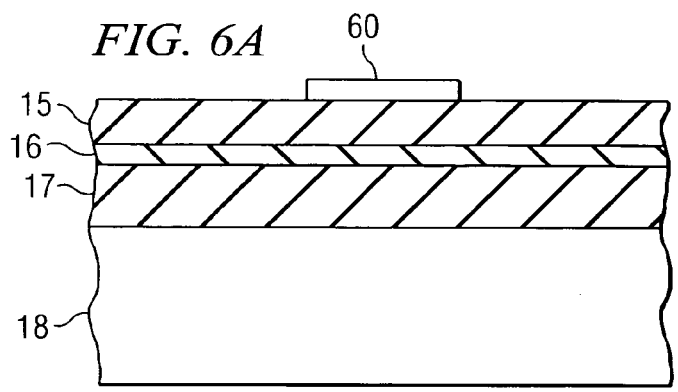
FIGS. 6A-6D, 7A-7D and 8 show the process for constructing total internal reflection turning mirrors in a waveguide.

FIG. 6A is a cross-sectional view showing first mask 60 for the waveguide pattern.

Figure 6B:
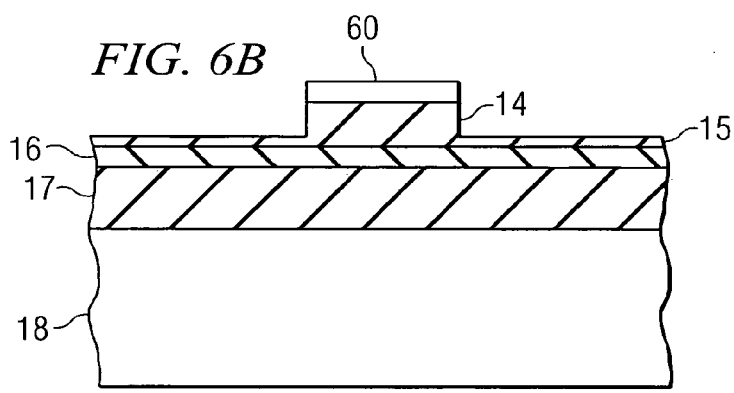

FIG. 6B is a cross-sectional view showing layer 15 dry etched away to form ridge 14.

Figure 6C:
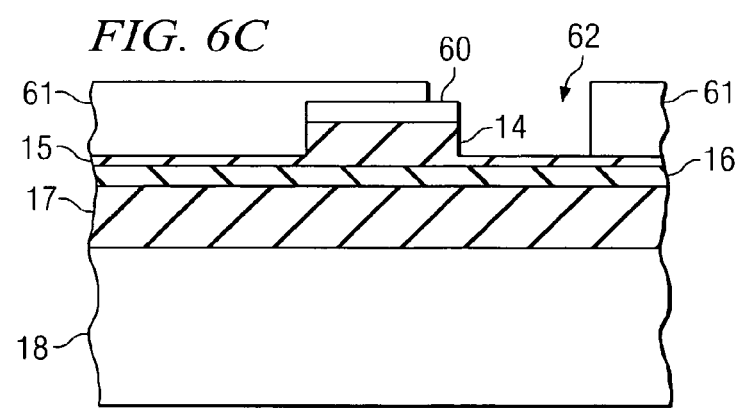

FIG. 6C is a cross-sectional view showing second mask 61 to form TIR mirror 62.

Figure 6D:
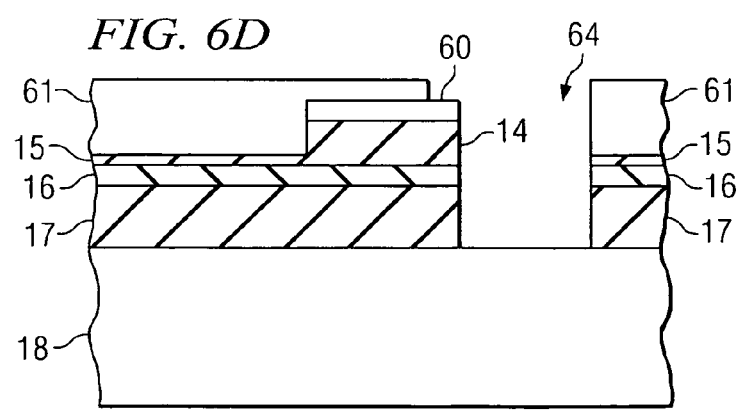

FIG. 6D is a cross-sectional view showing TIR mirror 62 formed through layers 15, 16 and 17.

Figure 7A:
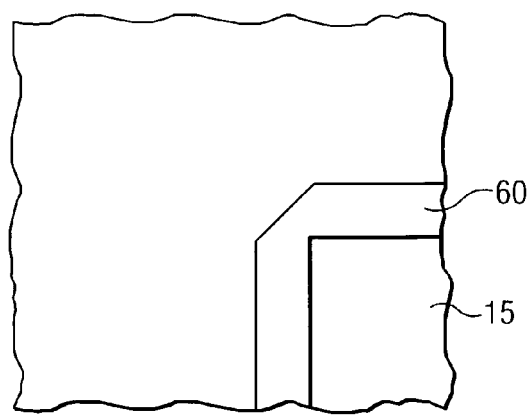

FIG. 7A is a top view of first mask 60 on top of upper cladding 15.

Figure 7B:
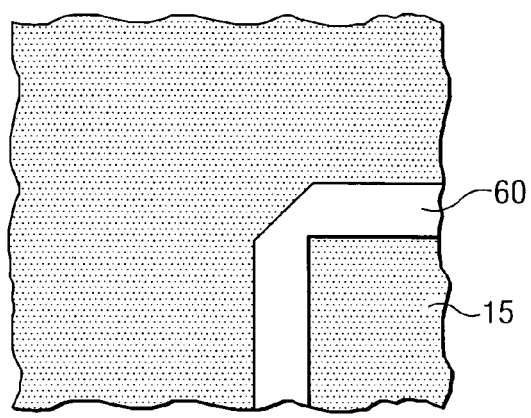

FIG. 7B is a top view of the etched ridge on top of cladding 15.

Figure 7C:
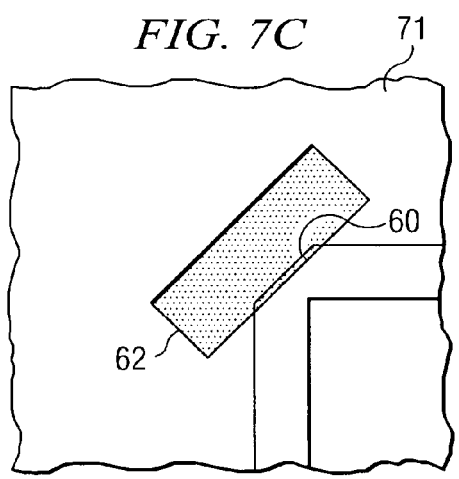

FIG. 7C is a top view of the area 62 where opening 62 will be etched.

Figure 7D:
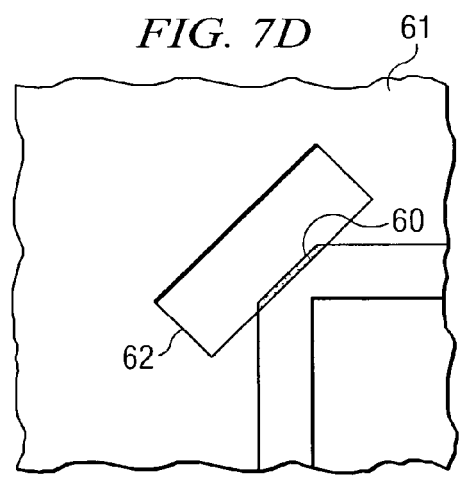

FIG. 7D is a top view showing opening 62 defined by both masks 1 (60) and 2 (61). Any misalignment between masks 1 and 2 can change the shape of the TIR mirror and thus change the functionality of the device.

Figure 8:
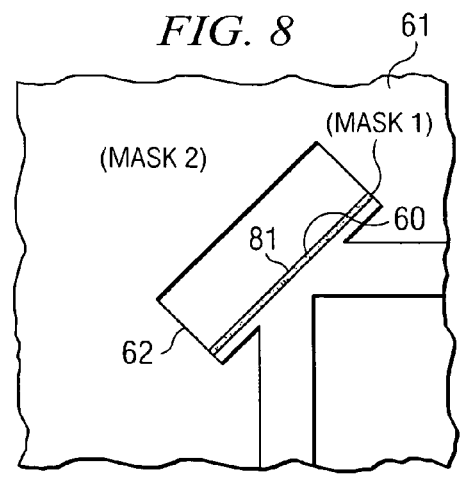

FIG. 8 is a top view of the self-alignment process showing the ideal alignment of mask levels 1 and 2 before etching. Only opening 62, which is not covered by either mask 1 or 2, will be etched. Since the opening of the second mask level reveals edge 81 of the first mask level, the TIR mirror will only be defined by edge 81 of the first mask level. In this manner the TIR mirror can be accurately reproduced as long as the width of the extended wing is greater than the alignment tolerance of the lithography tool. Accordingly, slight twisting or mis-alignments of mask 2 are not critical.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An optical transmission medium for communicating optical signals along an optical path, comprising:

a first solid-core waveguide portion defining a first portion of the optical path, the first solid-core waveguide portion formed in a solid material having a first end and a second end, the first end of the first solid-core waveguide portion having a first wing portion co-formed with a remaining portion of the first solid-core waveguide portion; and a second solid-core waveguide portion defining a second portion of the optical path, the second solid-core waveguide portion co-formed in the solid material with the first solid-core waveguide portion and aligned at an angle of substantially 90 degrees to the first solid-core waveguide portion, the second solid-core waveguide portion having a first end and a second end, the first end of the second solid-core waveguide portion having a second wing portion co-formed with a remaining portion of the second solid-core waveguide portion, the first end of the first solid-core waveguide portion meeting the first end of the second solid-core waveguide portion at a junction region defined by a cavity in the solid material, the cavity defining a discontinuity between the first solid-core waveguide portion and air in the cavity, the discontinuity having a first end, a second end, and a radius of curvature, the discontinuity forming a total internal reflection interface between the first end of the first solid-core waveguide portion and the first end of the second solid-core waveguide portion, the total internal reflection interface causing a substantial portion of the optical signals communicated along the optical path to traverse a substantially 90-degree bend between the first solid-core waveguide portion and the second solid-core waveguide portion, the first wing portion extending along the first end of the discontinuity in alignment with the discontinuity, the second wing portion extending along the second end of the discontinuity in alignment with the discontinuity.

2. The optical transmission medium of claim 1 wherein a width of said discontinuity is sufficient to capture a substantial portion of said optical signals traversing said bend.

3. The optical transmission medium of claim 1 wherein said radius of curvature is established to compensate for diffraction of the optical signals so as to transmit substantially all of said optical signals around said bend.

4. The optical transmission medium of claim 1 wherein said radius of curvature is between 5 and 1000 micrometers.

5. The optical transmission medium of claim 1 wherein each of the first and second wing portions has a length sufficient to catch an optical mode profile of the optical signals.

6. The optical transmission medium of claim 5 wherein a width each of the first and second wing portions is between one and five times a width of the optical mode profile.

7. The optical transmission medium of claim 5 wherein optical signal scatter caused by said first and second wing portions is compensated for by said radius of curvature.

8. The optical transmission medium of claim 1 wherein each of said first and second solid-core waveguide portions comprises a low index contrast waveguide.

9. The optical transmission medium of claim 8 wherein said low index contrast waveguide is one of: a ridge waveguide or a buried waveguide.

10. The optical transmission medium claimed in claim 1, wherein the first and second wing portions follow the radius of curvature of the discontinuity.

* * * * *